United States Patent [19]

Valva et al.

[11] Patent Number: 4,896,647
[45] Date of Patent: Jan. 30, 1990

[54] CUTTING TOOL SYSTEM FOR CUTTING STONE AND METHOD OF CUTTING SAME

[76] Inventors: Frank Valva, Saxon on the Bay, Bay Shore, N.Y. 11706; Gene Kirshak, 106 Oleeta Rd., Mt. Sinai, N.Y. 11766

[21] Appl. No.: 326,985
[22] Filed: Mar. 22, 1989
[51] Int. Cl.⁴ .............................................. B28D 1/04
[52] U.S. Cl. ........................................ 125/14; 125/35; 51/240 R; 51/35; 144/286 A
[58] Field of Search ................. 125/14, 35; 51/39, 66, 51/78, 87 R, 240 A, 240 R, 34 C, 34 D, 34 E, 34 F, 34 G, 35, 56 R; 144/286 R, 286 A

[56] References Cited

U.S. PATENT DOCUMENTS 1,921,744  8/1933  Goodell et al. .................. 51/240 R
2,589,489  3/1952  Fuhr ................................. 51/240 R Primary Examiner—Frederick R. Schmidt
Assistant Examiner—M. Rachuba
Attorney, Agent, or Firm—Alfred M. Walker

[57] ABSTRACT

A cutting system for cutting heavy stone slabs wherein the heavy slabs are supported in a fixed horizontal position by means of a plurality of apertures which are adapted to receive a plurality of rollers, the rollers extending in an upward direction adapted to protrude through said apertures to support the heavy slab and to rotate said heavy slab in any direction so as to permit manipulation of said slab above the member. The cutting system also includes a multi-directional carriage for moving a cutting tool in any direction upon the surface of the heavy slab.

13 Claims, 7 Drawing Sheets

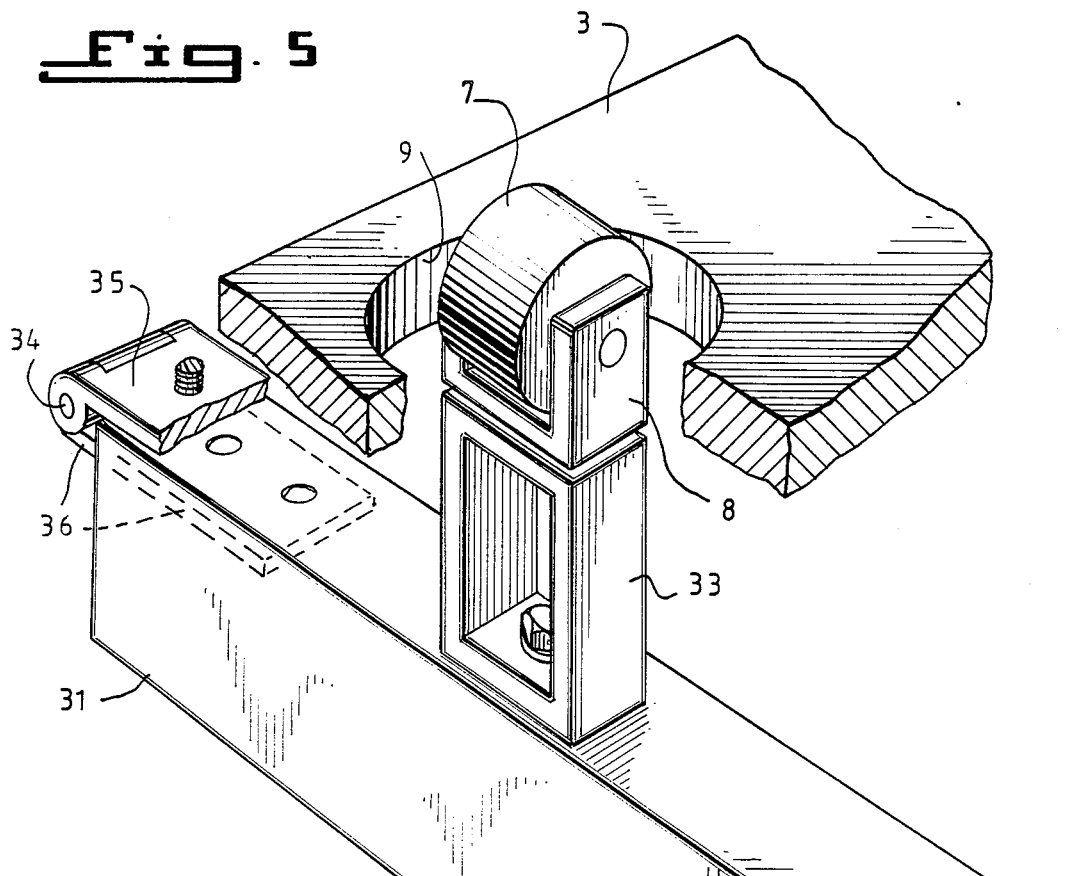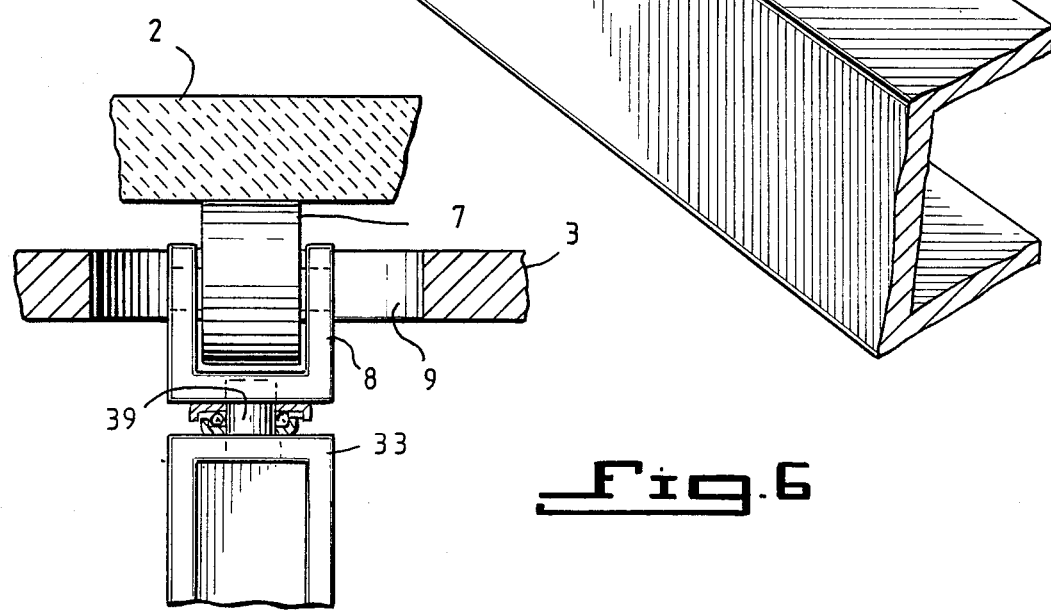

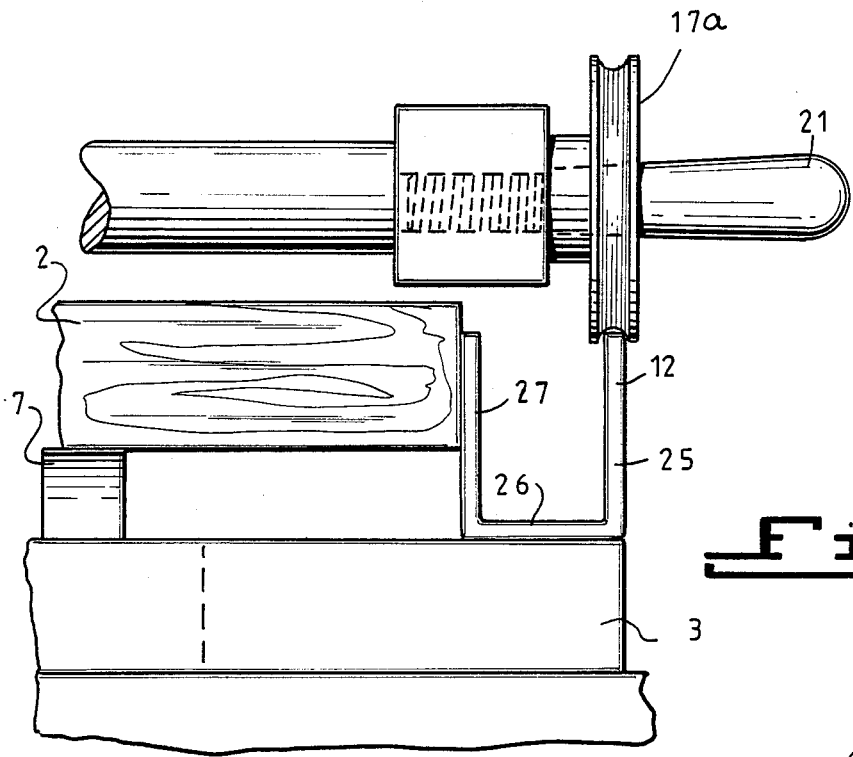
Fig. 8
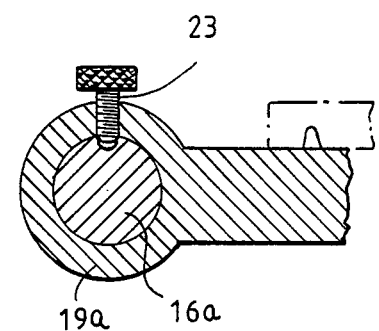
Fig. 10
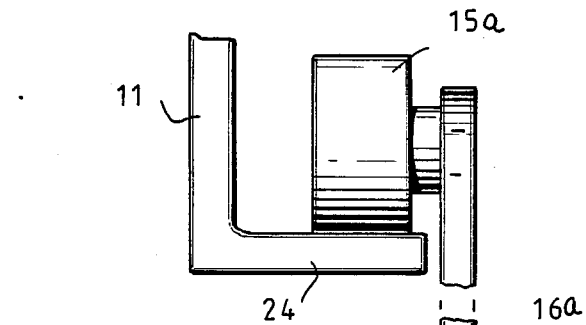
Fig. 9
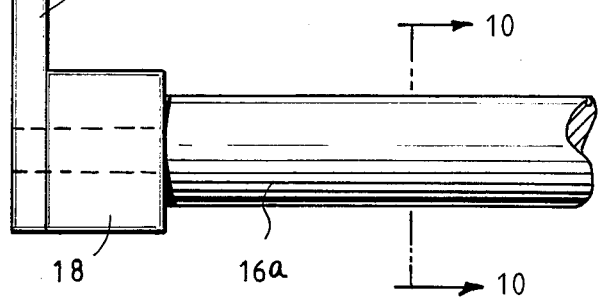

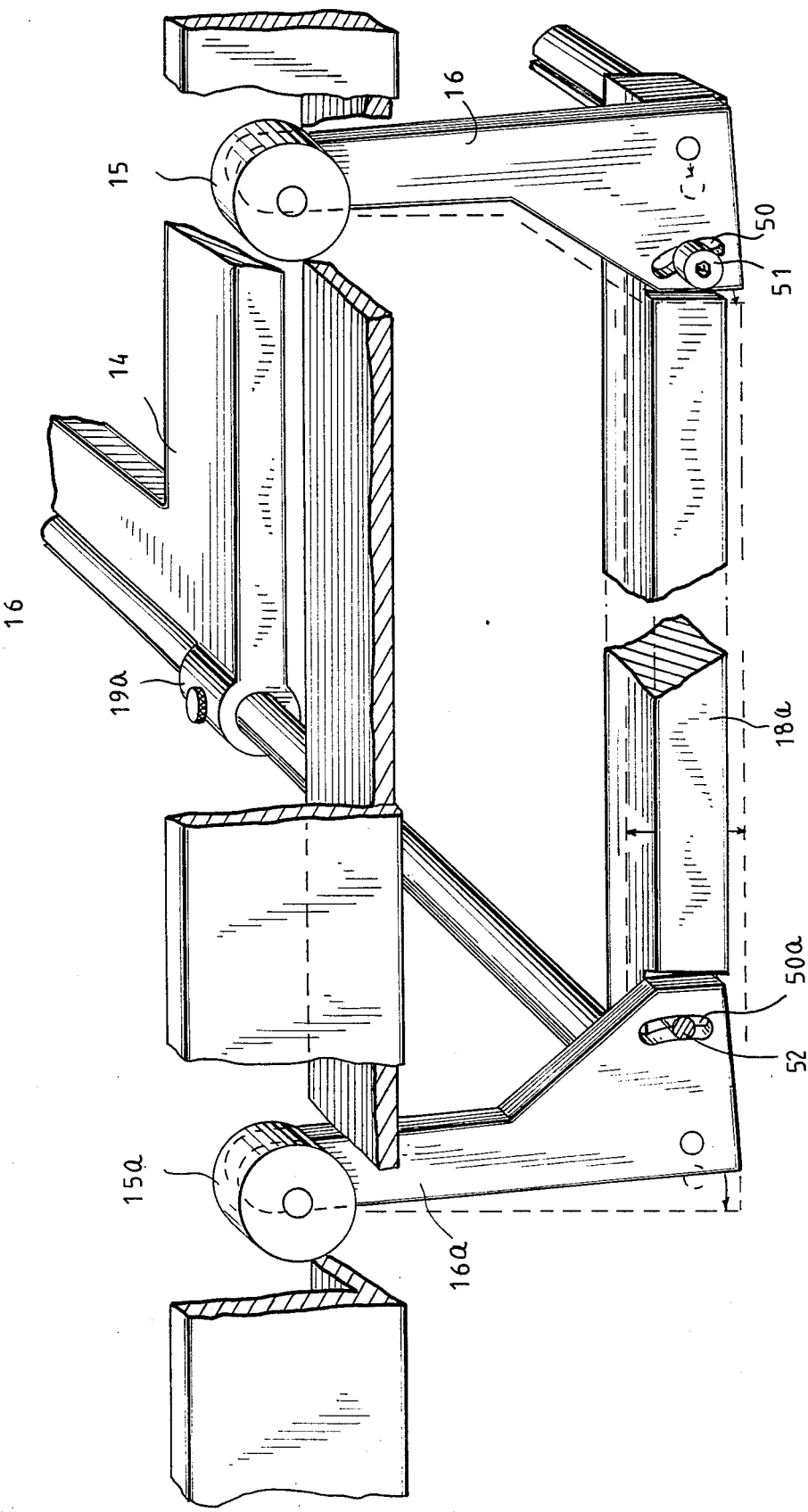

CUTTING TOOL SYSTEM FOR CUTTING STONE AND METHOD OF CUTTING SAME

BACKGROUND OF THE INVENTION

The present invention relates to a cutting tool system for cutting large heavy slabs such as marble, granite, corian, avinite, other stones and wood sheets, and a method of cutting the same. More particularly, it relates to a positional manipulation system to move in position heavy stone slab for easy cutting. The system provides a lifting mechanism to lift the stone slab into a desired position and multi-directional movable housing for the cutting tools.

Cutting tools and methods of the above-mentioned general type are known in the art. In a conventional precutting a template design is applied to the board or etched onto its upper surface. Then the stone slab is cut by a conventional cutting tool, to provide the desired shape of the slab. The conventional cutting tool does not however provide a high accuracy of cutting along a required contour, and in many cases it is difficult to maneuver the heavy stone slabs to cut the slabs again to obtain a final shape and size. It is to be understood that such method can be improved.

SUMMARY OF THE INVENTION

Accordingly, it is an object of the present invention to provide a cutting tool system and a method of cutting stone slabs, which avoid the disadvantages of the prior art.

It is a further object of the present invention to provide support for such stone slabs.

In keeping with these objects and with others which will become apparent hereinafter, one feature of the present invention resides, briefly stated, in a tool system which in addition to a movable carriage for a cutter has a lifting mechanism arranged to abut against the heavy stone surface to which the cutting must be applied. The lifting mechanism has a retraction apparatus to allow the weight of the stone slab to securely rest in a desired position for cutting.

A cutting system for cutting marble stone slabs wherein the marble slabs are supported in a fixed horizontal position by means of a plurality of apertures which are adapted to receive a plurality of rollers, the rollers extending in an upward direction adapted to protrude through said apertures to support the marble slab and to rotate the marble slab in any direction so as to permit manipulation of said slab above the member.

It is also a new feature of the present invention that the cutting is performed by the above described tool system with a rolling multi-directional carriage for the cutting tools, built to move in any direction against the planar surface of the slab without using time consuming hand measured templates and hand held cutting tools.

It is especially important that the cutting surface of the tool move in any curved or straight direction along the plane of the slab, and the movement is performed with a multi-linear contact of the cutting tool against the surface plane of the stone slab.

The novel features of the present invention are set forth in particular in the appended claims. The invention itself, however, both as to its construction and its operation, will be best understood from the following description of a preferred embodiment, which is accompanied by the following drawings.

BRIEF DESCRIPTION OF THE DRAWINGS

FIG. 5 is a detail perspective view of a lifting portion of a stone cutting system in accordance with the present invention.

FIG. 6 is a detail side view in partial section of a lifting portion of a stone cutting system in accordance with the present invention.

FIG. 8 is a detail partial side view of the cutting tool housing portion of a stone cutting system in accordance with the present invention.

FIG. 9 is a detail partial side view of the cutting tool housing portion of a stone cutting system in accordance with the present invention.

FIG. 10 is a detail front view in cross section of a portion of the cutting tool housing portion of a stone cutting system in accordance with the present invention.

FIG. 11 is an enlarged perspective view of a portion of the carriage showing vertical adjustment thereof.

DESCRIPTION OF A PREFERRED EMBODIMENT

Figure 1:
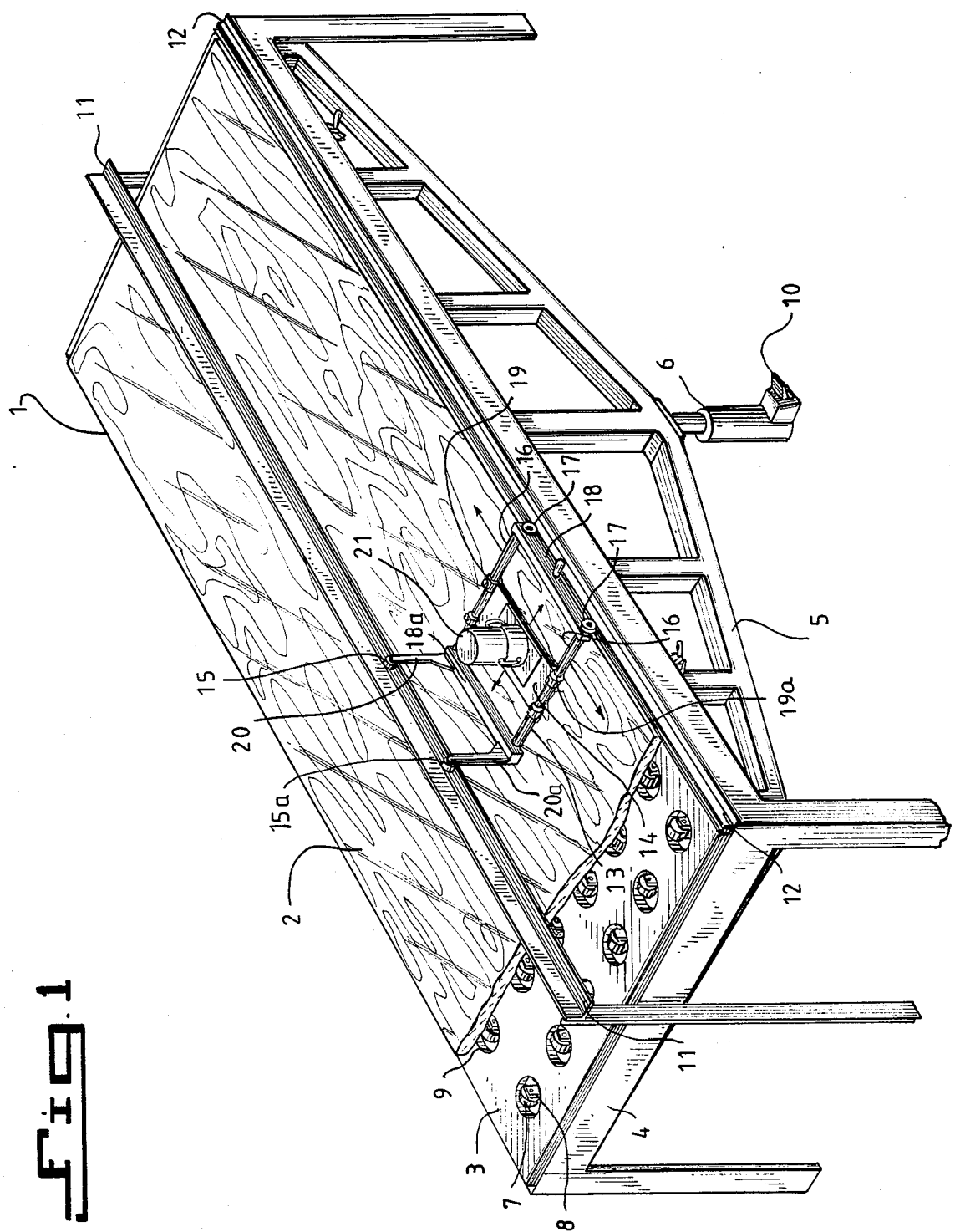
FIG. 1 is a perspective view of a cutting tool system in accordance with the present invention.
Figure 2:
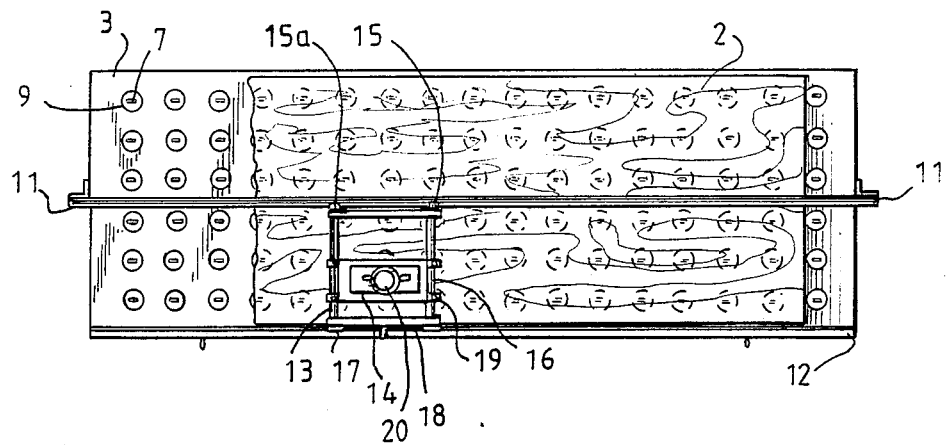
FIG. 2 is a top view of a stone cutting system in accordance with the present invention.
Figure 3:
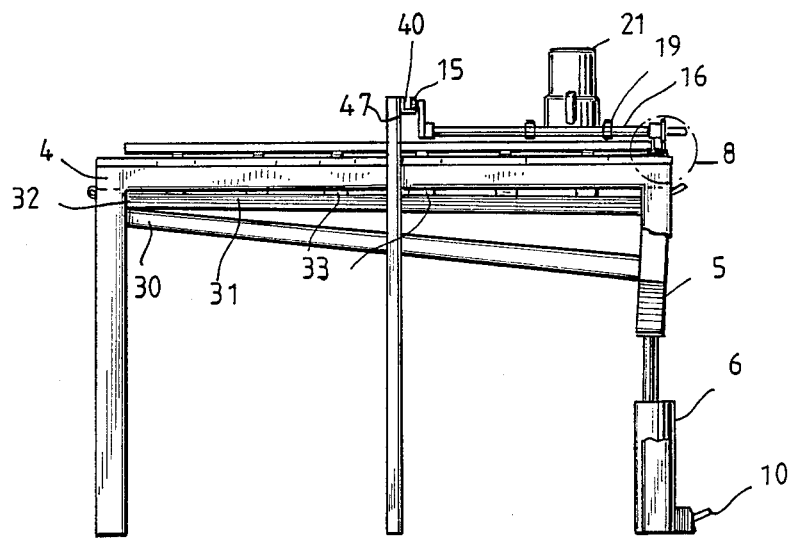
FIG. 3 is a side view of a stone cutting system in accordance with the present invention.
Figure 4:
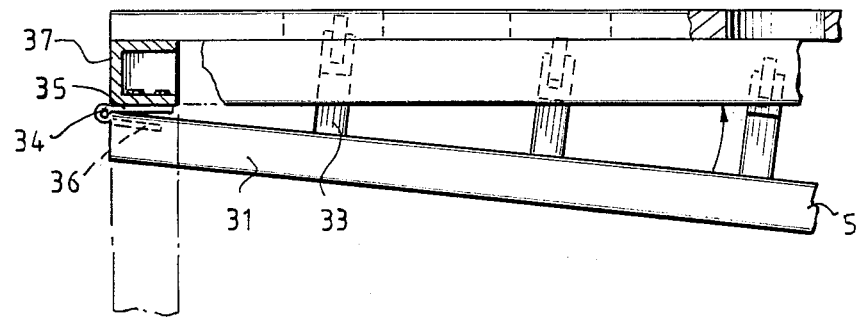
FIG. 4 is a detail side view of a lifting portion of a stone cutting system in accordance with the present invention.
Figures 6A, 6B:
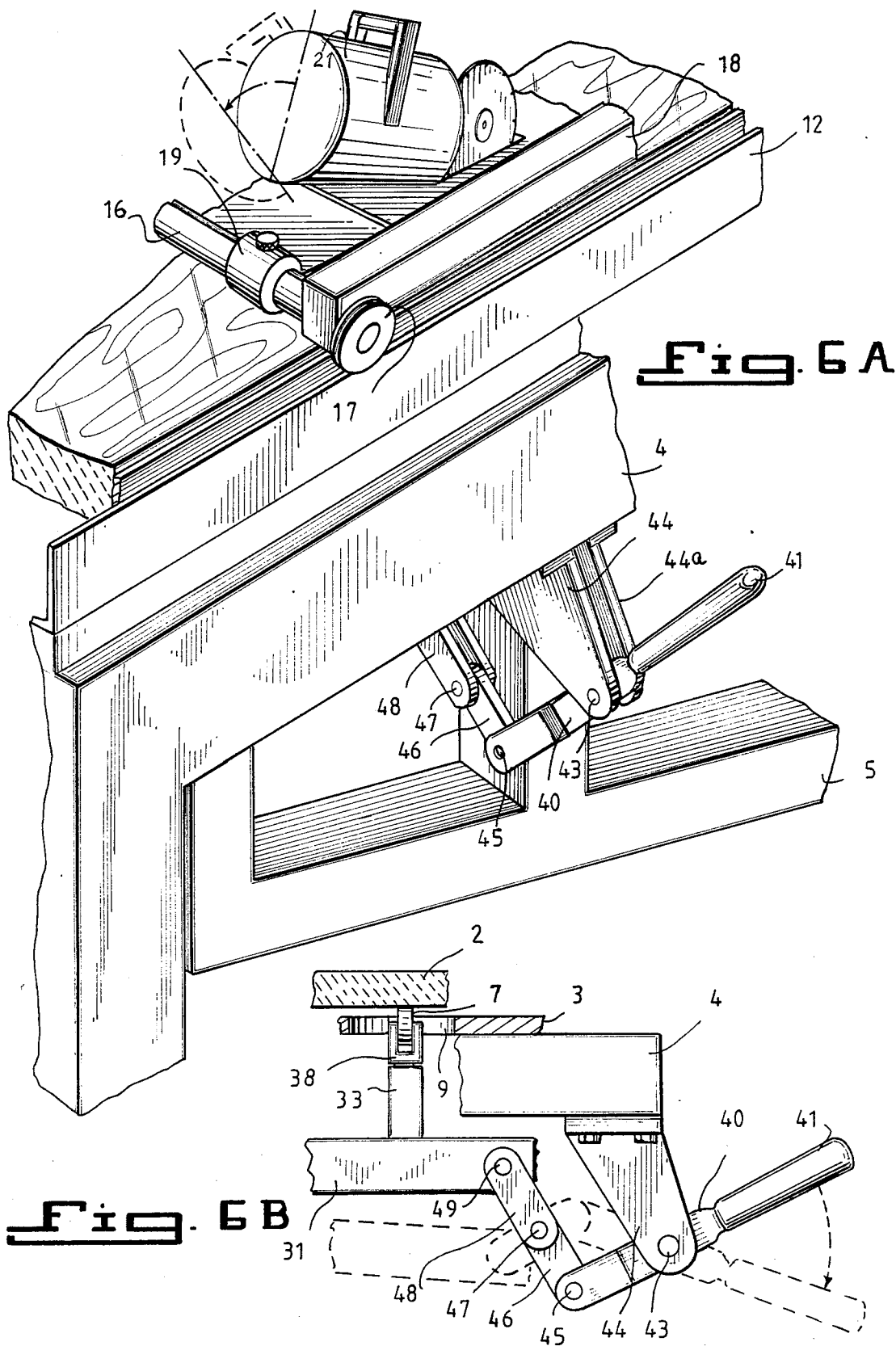
FIG. 6A is a detail view of a lifting portion and a cutting tool portion of a stone cutting system in accordance with the present invention.
FIG. 6B is a detail view of a lifting portion and a cutting tool portion of a stone cutting system in accordance with the present invention.
Figure 7:
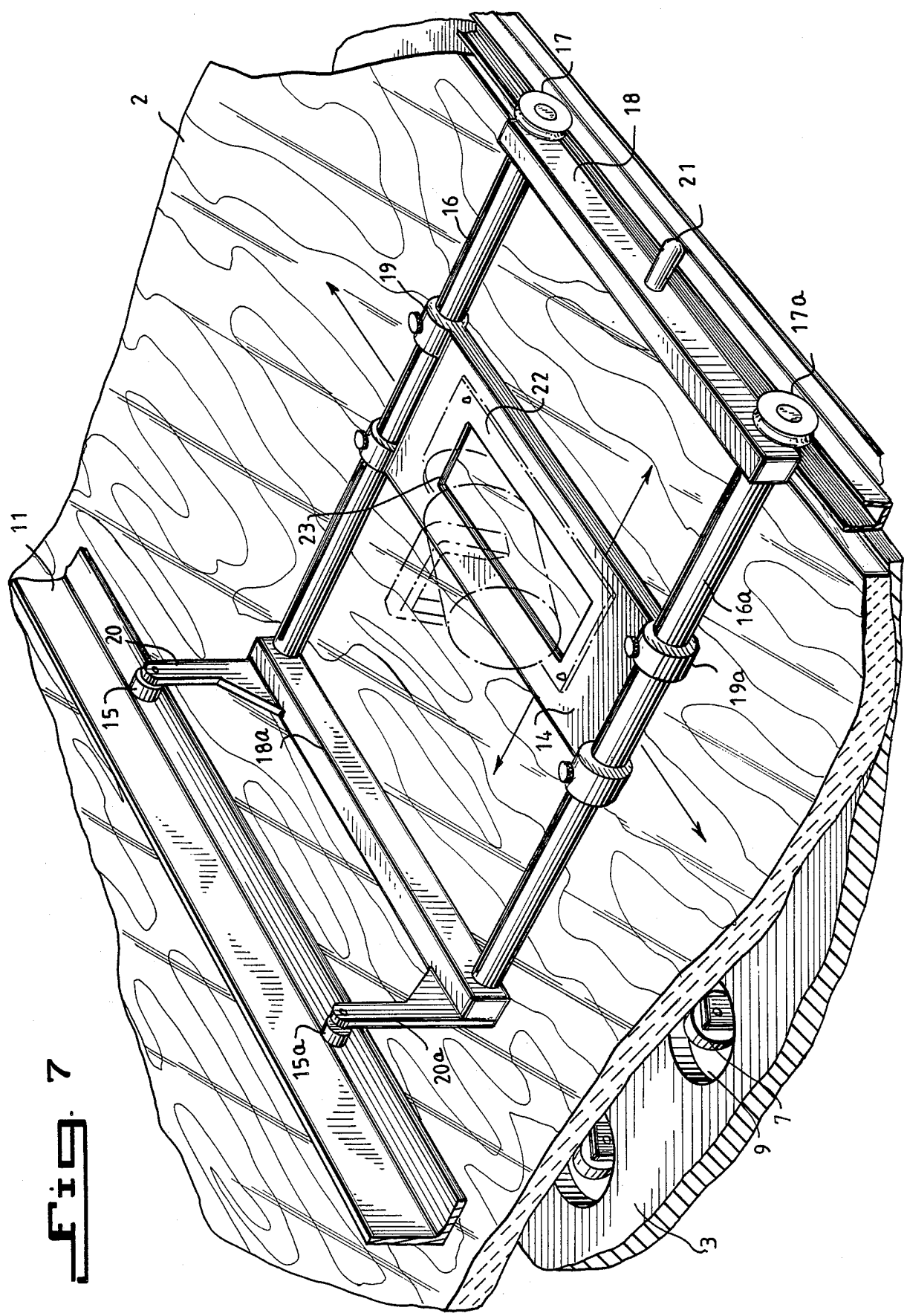
FIG. 7 is a detail perspective view of the cutting tool housing portion of a stone cutting system in accordance with the present invention.

A stone cutting tool system in accordance with the present invention is identified as a whole with reference numeral 1. It is used for cutting a stone slab 2 with a variety of curved or straight cuts.

The tool system 1 has a horizontal platform 3 which conventionally can be attached to base 4. A movable hinged support system 5 actuated by hydraulic jack 6, supports a plurality of rotatable rollers 7, 7a, 7b mounted on casters 8, 8a, 8b up and through a matrix plurality of apertures 9 within horizontal platform 3. A foot pedal 10 is mounted on the hydraulic jack 6, for actuating the hinged support system 5. Other conventional lifting mechanisms, such as air or electric powered pistons, may be employed.

As can be seen from the drawing, in the system, the rollers 7, 7a, 7b must project vertically beyond the top surface of the horizontal platform by a distance which exceeds the height of platform 3. As can be seen from FIG. 5, rollers 7, 7a, 7b rotate 360° within caster 8 over brace support 33. Stone slab 2 is lifted up by the vertical lift of rollers 7, 7a, 7b by means of the elevation of hinged support structure 5. Because rollers 7, 7a, 7b rotate 360°, the rollers are designed to perform this operation so as to enable a person to maneuver stone slab 2 into the desired position for cutting.

The carriage 13 of the cutting tool system is selected so that its height is above the surface of the stone slab 2.

Two linear tracks 11 and 12 are provided for the longitudinal movement of carriage 13 along the surface of stone slab 2. Carriage 13 supports tool housing 14. Rotatable rollers 15 and 15a travel over track 11.

Rollers 15 and 15a rotate while mounted to extension members 20 and 20a which provide support to cross member 18a. Corresponding rollers 17 and 17a travel rotatably upon angle iron track 12 and are rotatably mounted upon cylindrical support systems 16 and 16a which connect cross members 18 and 18a. Tool housing 14 houses tool 21 such as a router or cutting blade device which must move in any direction along the surface of stone slab 2. In order to achieve this multi-directional movement, the carriage housing 13 moves longitudinally along the surface of the marble stone by means of rollers 15, 15a and 17 and 17a upon tracks 11 and 12 respectively. Tool 21 is also moved in a direction perpendicular to the longitudinal direction by means of the sliding of the tool housing 14 along cylindrical tracks 16 and 16a by means of ring-shaped end members 19 and 19a. In one embodiment of the device, the rings are steel, surrounding lubricated brass bushings. By combining the longitudinal with the perpendicular movement, the user can accomplish any shape of curve upon the stone slab within the portion of the slab placed beneath elevated angle iron track 11 and U-shaped angle iron track 12. To achieve cutting on the remaining side of the stone slab, the tool 21 is lifted and rollers 7, 7a, 7b are elevated by means of hydraulic jack 6 and hinge support member 31 so as to lift the stone slab where it can be rotated in any direction upon the elevated rollers. The stone slab is then rotated 180° so that cutting can be performed on the opposite side of the stone slab. Carriage 13 may be adapted to accommodate a water cooling device for cooling the blades or bits used with the cutting tool 21. Water must be used to avoid the potential harmful effects of petroleum products on the slab surface.

The elevation and lowering of rollers 7, 7a, 7b is achieved by the angular movement of hinged element 31 which is achieved by means of hinge 34 having hinge arms 35 and 36 such that hinge arm 36 is attached to support arm 31 and hinge arm 35 is attached to brace 37 of the base 4 of the device.

Rollers 7, 7a, 7b rotate within casters 8, 8a, 8b about rotatable arm 39 which is attached to brace 33 disposed to hinge support element 31.

The locking of the raised and lowered support brace 31 is achieved by means of levers 40, 44, 46 and 48 which rotate about hinges 43, 45, 47 and 49 so as to lock the raised and lowered position of support member 31 holding brackets 33, casters 8, 8, 8b and rollers 7, 7a, 7b of the device. Set screw 23 is provided in tool housing 13 to connect and adjust the tightness of ring section 19 and 19a over cylindrical track means 16 and 16a.

Because cross member 18a hangs from extension members 20 and 20a and it does not rest upon a separate track itself there is a tendency for cross member 18a to sag. Therefore, an adjustment mechanism is provided by means of hinge 52 and handle 51 such that handle 51 is raised and lowered within oval-shaped aperture 50 and hinge 52 is moved within oval-shaped aperture 50a so as to make a precise fit of cross member 18a with respect to the top surface of marble slab 2.

When the system is designed and a cutting is performed in accordance with the present invention, marble stone slabs can be cut with a much faster and higher accuracy. The invention adapts the use of hand tools in the performance of slab cutting in the industrial shop application.

The invention is not limited to the details shown since various modifications and structural changes are possible without departing in any way from the spirit of the present invention.

What is desired to be protected by Letters Patent is set forth in particular in the appended claims.

We claim:

1. A cutting system for cutting a heavy slab comprising:
   a substantially flat member, having a plurality of apertures;
   means for supporting said flat member in a fixed and substantially horizontal position;
   a plurality of rollers extending in an upward direction and extending through said plurality of apertures of said substantially flat member in order to protrude therefrom and be able to support the slab above said substantially flat member so as to permit manipulations of said slab above said member; and,
   means for supporting said plurality of rollers in a fixed relationship relative to said plurality of apertures of said substantially flat horizontal member, said support means comprising a hinged support structure such that said rollers are disposed upon the support structure and are elevated by means of raising and lowering the hinged support structure so as to protrude through the apertures.

2. The cutting system as claimed in claim 1 wherein the rollers are rotatably mounted within a caster which is attached to a brace disposed to said hinged support structure.

3. The cutting system as claimed in claim 1 wherein said hinged support system comprises means for mountably placing and attaching the hinged support system to a base support.

4. The cutting system as claimed in claim 3 such that the said hinged support system is raised and lowered by means of a hydraulic power system.

5. The hinged support system as claimed in claim 3 such that the said hinged support system is raised and lowered by means of an electric power system.

6. The hinged support system as claimed in claim 3 such that the said hinged support system is raised and lowered by means of an air powered power system.

7. The cutting system as claimed in claim 3 such that the rollers are manipulated upward by means of a hydraulic system and a combination of levers to lock in the said raised and lowered hinged support system.

8. The cutting system as claimed in claim 1 further comprising a carriage for holding cutting tools such that the carriage is movable in any direction upon this surface of said heavy slab.

9. The cutting system as claimed in claim 8 wherein a carriage system is provided such that a tool moves longitudinally by means of rollers across a pair of longitudinal tracks and said carriage further moves perpendicular to said longitudinal direction by means of the sliding of said carriage across a track means perpendicular to said longitudinal direction.

10. The cutting system as claimed in claim 9 wherein the first longitudinal track means is provided for a pair of rollers which are attached to a pair of descending extension members attached to cross members positioned in a longitudinal direction of the device and further comprising a pair of cylindrical rollers adapted to ring-shaped end members of a tool housing carriage such that the ring-shaped members move in a perpendicular direction along the cylindrical track members in a direction perpendicular to the longitudinal direction of the first said pair track means, and a second pair of rollers which are directly attached at the opposite end to said cylindrical track members from where said first pair of descending extension members attach to said cylindrical track members.

11. The carriage means as claimed in claim 10 wherein the first said cross member is adjusted by means of the rotation of additional hinged elements within oval-shaped apertures so as to stabilize the position of the first said cross member with respect to the height of the heavy slab.

12. A method for cutting a stone slab comprising the steps of:
   placing the slab upon a base,
   elevating the marble slab upward by means of protrusion of rollers through apertures of said base, the protrusion of the rollers caused by the raising of a hinged support carrying said rollers;
   cutting the said slab by means of a multidirectional movement of a cutting device such that the cutting device moves either in a longitudinal or perpendicular direction with respect to the length of the slab,
   providing a tool located within said cutting device and a guide for moving the cutting tool in any direction upon the surface of said slab, and
   moving the tool along a contour of a desired line along the surface of the slab so as to cut the slab in a predetermined curve.

13. The method as claimed in claim 12 wherein the moving includes adjusting the height of the tool carriage by means of premeasuring the height and moving a cross member of the carriage with respect to the height of the latter.

* * * * *